March 20, 1951 L. W. ALVAREZ 2,545,595
LINEAR ACCELERATOR
Filed May 26, 1947 5 Sheets-Sheet 1

INVENTOR
LUIS W. ALVAREZ
BY
ATTORNEY.

March 20, 1951     L. W. ALVAREZ     2,545,595
LINEAR ACCELERATOR Filed May 26, 1947     5 Sheets-Sheet 2

INVENTOR
LUIS W. ALVAREZ
BY
ATTORNEY.

March 20, 1951 L. W. ALVAREZ 2,545,595
LINEAR ACCELERATOR
Filed May 26, 1947 5 Sheets-Sheet 3

INVENTOR
LUIS W. ALVAREZ
BY
ATTORNEY.

INVENTOR
LUIS W. ALVAREZ
BY
Robert A. [signature]
ATTORNEY.

Patented Mar. 20, 1951

2,545,595

UNITED STATES PATENT OFFICE 2,545,595

LINEAR ACCELERATOR

Luis W. Alvarez, Berkeley, Calif., assignor to the
United States of America as represented by the
United States Atomic Energy Commission Application May 26, 1947, Serial No. 750,598

11 Claims. (Cl. 315—15)

This invention relates to a method and apparatus for ion acceleration at high energies and more particularly to an ion accelerator utilizing the energy of electric fields in a resonant cavity to accelerate ions in quantity.

Heretofore long cylindrical cavities, or wave guides, excited to permit the formation of standing waves therein having a very high node to node impedance and electrically loaded so that an electron traveling along the axis at the velocity of light would experience a force which is always in the forward direction, have been used for electron acceleration. However, with ions the case is quite different as it is not possible to load a wave guide so that the wave velocity will be as slow as that of ions, and consequently such wave guides are impractical for use for ion acceleration.

Now it has been found, that by exciting a long cylindrical cavity, or wave guide in the axial electric mode and placing coaxial drift tubes at regular intervals along the axis of the guide, forming a sequence of gaps, ions will be accelerated therethrough if the drift tubes are at the proper spacing to act as shields to protect the ions from the reverse potential which occurs every half cycle of the exciting frequency as the ion progresses along the axis of the guide.

Thus an ion traveling along the axis of such a wave guide will receive an acceleration in one gap and travel through a drift tube while the fields are reversed and arrive at the next gap when the fields are in the proper phase.

The ions will therefore enter this new field when it is in a proper direction to accelerate them in the same direction as they were accelerated in the gap traversed one cycle earlier. In this manner ions can be made to serially traverse a sufficient number of gaps to give them a total acceleration which will impart the desired energy.

The above elucidated concept has been embodied into a practical device for accelerating ions to energies as high as forty-five million electron volts.

It is therefore the object of this invention to provide a linear ion accelerator of simple structure.

Another object of this invention is to provide an ion accelerator capable of producing an effective ion beam accelerated to a velocity at which the energy is of the order of many million electron volts.

Another object of this invention is to provide a sectional ion accelerator, which, when energized, will produce ion acceleration in accordance with the amount of power supplied and the number of sections.

Another object of this invention is to provide an ion accelerator with means of producing electric fields in the proper mode to create ion acceleration therethrough.

Another object of this invention is to provide an ion accelerator capable of maintaining ions in proper phase during the entire acceleration period.

Another object of this invention is to provide an ion accelerator with drift tubes to shield the ions during the reverse half of the cycle.

Another object of this invention is to provide an ion accelerator with means of using metallic foils to focus the ion beam.

Another object of this invention is to provide a simple, efficient and readily constructed ion accelerator, whereby ions can be effectively accelerated to forty-five or more million electron volts for use in nuclear research or for similar purposes.

The invention, both as to its organization and method of operation, together with further objects and advantages thereof, will best be understood by reference to the following specification taken in connection with the accompanying drawings, in which.

Figure 1:
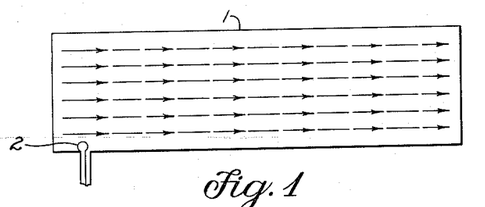
Figure 1 is a diagram showing a normal cylindrical wave guide and the axial electric field distribution therein.

Referring directly to the drawings for a more detailed discussion and description of the invention and, first, referring to Fig. 1, there is shown a conventional elongated cylindrical wave guide 1, excited by a power source at the proper frequency to produce an axial electric field distribution therein through a coupling loop 2, in which the magnetic field is circumferential and the field longitudinal. At the ends of the wave guide, the longitudinal current flow becomes radial and of zero value on the axis. The critical frequency at which this field distribution takes place is the only frequency for which this pattern can occur for a given size wave guide.

Figure 2:
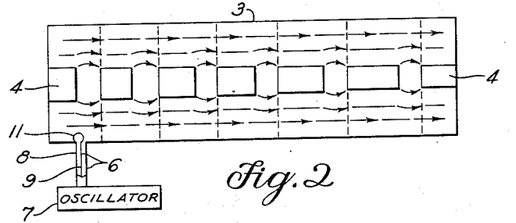
Fig. 2 is a diagram showing a wave guide and the electric fields when a series of graded drift tubes are placed therein.

However, in a wave guide of the length and form shown in Fig. 1, the frequency will be too high for an ion to travel from one end of the wave guide to the other while the axial electric field is in the proper direction. Therefore, in order to use a long wave guide, it is necessary to add a series of coaxial tubes along the axis as shown in Fig. 2 forming a series of gaps of appropriate lengths so that ions will be accelerated when they are crossing the gaps and will be protected from the fields in the wave guide when they are traveling in the coaxial tubes. The analysis of the electric fields in the wave guide, having coaxial drift tubes, may be made on the basis that the guide consists of a number of re-entrant cavities.

Now referring more particularly to Fig. 2, there is shown a section view of a cylindrical wave guide 3, with a series of drift tubes 4. The wave guide can be energized by an oscillator output transmission line 6 entering wave guide 3 from an oscillator 7. An oscillator output transmission line comprises an outer conductor 8 attached to wave guide 3 and an inner conductor 9 entering the wave guide as a loop 11 and returning to contact outer conductor 8.

It may be preferable to use only one high power oscillator and one coupling loop for exciting the wave guide, however, a number of lower power oscillators along with the number of coupling loops placed at convenient locations along the wave guide may be utilized with the same results.

Power at the resonant frequency can now be supplied to the wave guide from oscillator 7 with the result that a strong electric field is produced across the gaps of the drift tubes.

Axially directed high velocity ions entering one end of the wave guide and drift tubes can now travel from one gap to the next gap in one radio frequency cycle, and such axially directed ions will be accelerated during such passage if properly phased with the radio frequency cycle. The entering ions will remain in proper phase with the radio frequency cycle since each drift tube is made proportionately longer than the one preceding it, and thus the ions pass through longer and longer drift tubes as they gain in speed. In keeping with the above, it is clear that acceleration of the ions could be theoretically continued indefinitely. Furthermore, the rate of the acceleration of ions throughout the entire accelerator is maintained uniform by decreasing the diameter of the drift tubes as their length is increased. This decrease in the diameter of the longer drift tubes establishes the axial electric mode of oscillation uniformly throughout the length of the wave guide when varying length drift tubes are used.

Figure 3:
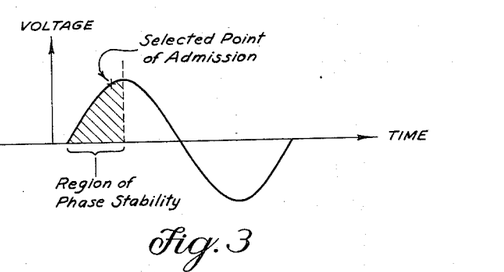
Fig. 3 is a diagram representing the voltage existing across the gaps of the drift tubes.

In Fig. 3 there is shown a graph representing the voltage existing across any one drift tube during one radio-frequency cycle. While it is desirable to have the ions cross the drift tube gaps at the peak of the radio-frequency cycle, in order to receive maximum energy gain per gap, it is also necessary that the ions remain in phase with the radio-frequency cycle during the entire acceleration period.

It being necessary that the ions be kept in phase during the entire acceleration period, they are injected into the accelerator before the peak of the radio-frequency cycle, as shown in Fig. 3. Therefore, ions arriving at the drift tube gap late with respect to the selected point of admission will be subjected to a higher accelerating potential, and ions arriving early with respect to the selected point of admission will be subjected to a lower accelerating potential.

It is obvious from the foregoing that phase stability will be attained during the entire acceleration period, because ions that are lagging with respect to the selected point of admission will be accelerated faster by virtue of the higher accelerating potential across the drift tube gap and conversely leading ions will not be subjected to as high an accelerating potential.

Figure 4:
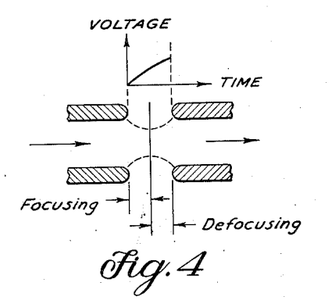
Fig. 4 is a diagrammatic longitudinal sectional view of drift tube ends with the electric field distribution existing across the gap.

Referring now to Fig. 4 there is shown a cross section of the ends of adjacent drift tubes with the electric field distribution across them shown as dotted lines. The graph above the drift tube ends represents the voltage curve with respect to time as the ions cross the drift tube gap. When ions are in phase traveling along the axis of the drift tubes in the direction of the arrows, the first half of the gap comprises a focusing region and the second half of the gap a defocusing region. Since the voltage is increasing with respect to time while the ions are in flight across the gap, the defocusing is more pronounced than the focusing. This is offset, but to a negligible degree, by the shorter time of flight for the second half of the distance.

Figure 5:
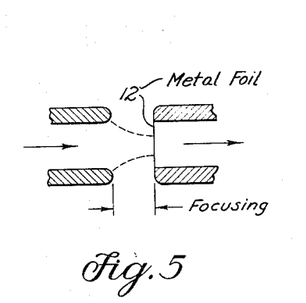
Fig. 5 is a diagrammatic longitudinal section view of drift tube ends with a focusing foil attached to one tube, and the resulting electric field distribution.

In order to achieve an overall focusing action a thin metallic foil 12 is placed over the entered end of the drift tubes as shown in Fig. 5 providing a planar equipotential surface which results in a focusing electric field over the entire drift tube gap and prevents divergence of the ion beam as it crosses the gap. A very thin metallic foil of low atomic weight is used over the drift tube end, in order to reduce the scattering effect of the ion beam as the ion beam passes through the foil.

From a practical point of view, the extent to which this means and method of accelerating ions can be carried out, is dependent only upon the physical length to which the accelerator wave guide can be extended, and the amount of power available for driving it. Therefore for a representative arrangement let us consider in detail an ion accelerator 40 feet long designed to operate at approximately 205 megacycles per second with a peak power input of 80 kilowatts per foot using a 150 to 300 microsecond pulse width, and a repetition rate of 15 pulses per second, to produce a beam of ions having energies of the order of 45 million electron volts.

Figure 6:
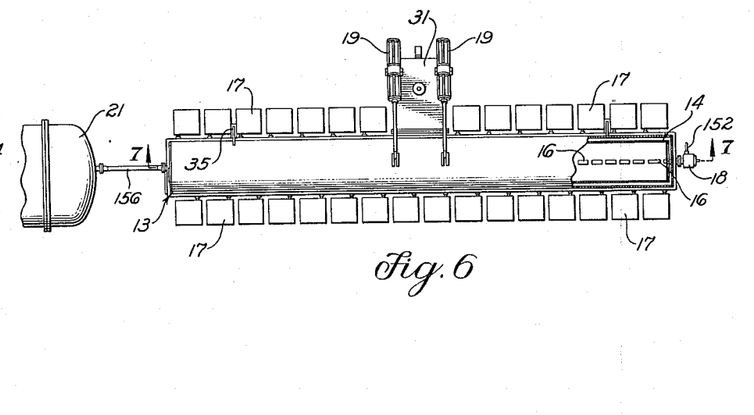
Fig. 6 is a plan view of one practical embodiment of the invention along with a multiplicity of oscillators adapted to energize the accelerator.

This representative arrangement is illustrated in Fig. 6 and comprises essentially of the following parts: vacuum tank 13, inner cavity 14, drift tubes 16, radio-frequency oscillators 17, target chamber 18, vacuum tank opening mechanism 19, and a source of ions including an electrostatic generator 21 or other device.

The tank 13 is preferably made as nearly as possible hermetically or vacuum tight in order that the inner cavity 14 can be established and maintained at the desired pressure. Under normal operating conditions the pressure is reduced below that of the atmosphere to a value of the order of $10^{-4}$ mm. Hg.

Figure 7:
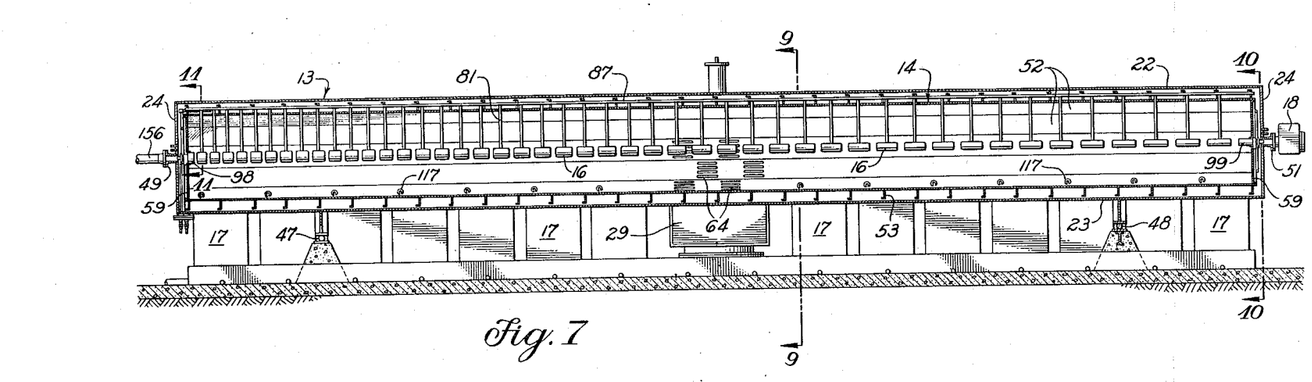
Fig. 7 is a longitudinal sectional view of the accelerator taken as indicated by section lines 7—7 in Fig. 6.
Figures 9, 10:
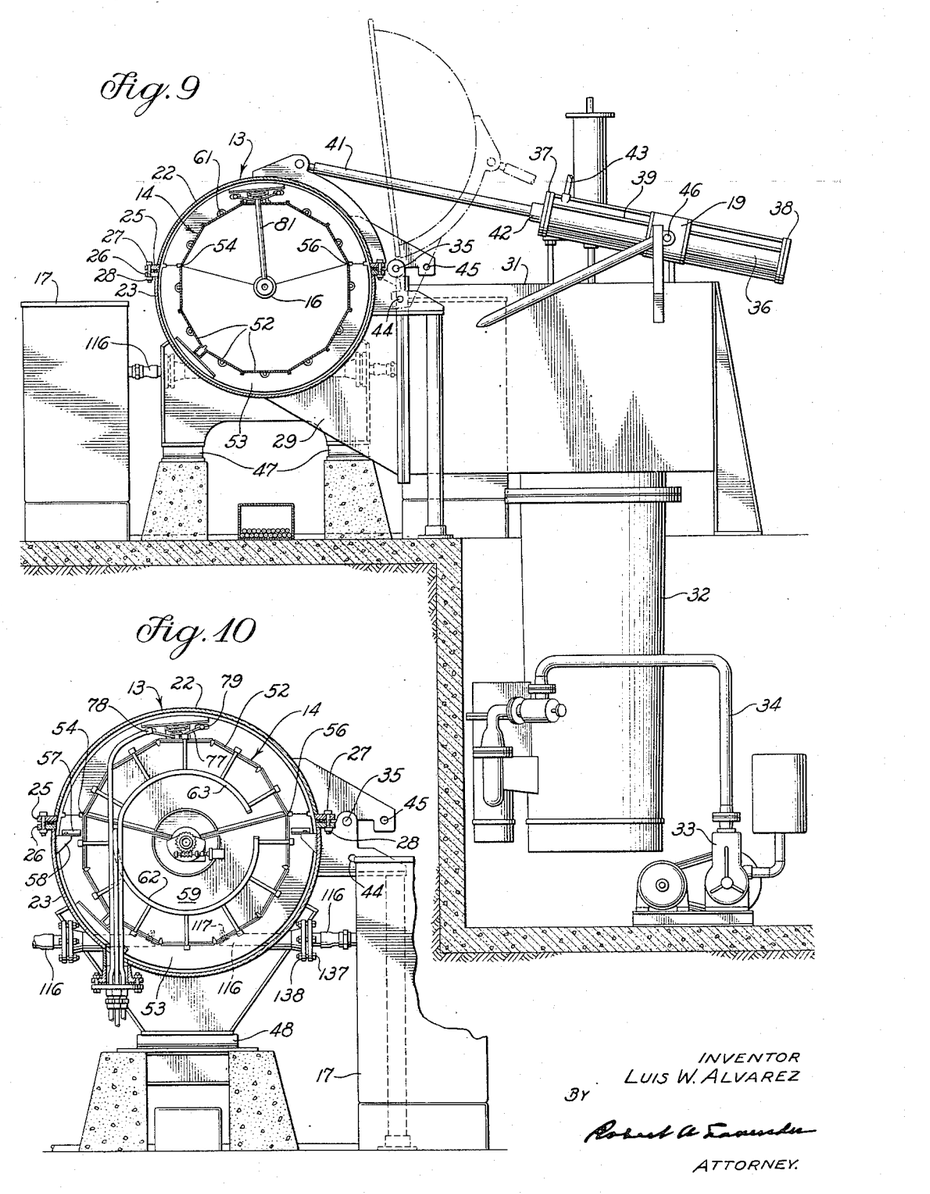
Fig. 9 is a view showing the vacuum equipment and surrounding structure, the view being in part a cross section, the plane of which is indicated by the line 9—9 of Fig. 7.
Fig. 10 is a cross section on a vertical plane generally indicated by the line 10—10 of Fig. 7 and showing, for the most part, the end of the inner cavity.

Fig. 7 depicts a longitudinal sectional view and Fig. 9 a transverse sectional view of the vacuum tank or envelope 13, conveniently made up of two metallic half cylinders 22 and 23 and welded or otherwise fastened in airtight fashion to end plates 24 to afford a chamber of cylindrical shape. Neither of these is made much thicker than necessary to resist the inward pressure.

The walls of the tank merge with a flange 25 adjacent to one terminal of the tank and with a flange 26 adjacent to the other terminal of the tank. These flanges are secured by any suitable means, such as welding, to the remaining portions of the tank in order to afford a vacuum tight connection therewith. They are each provided with a plurality of fastening bolts 27 and nuts 28 or other releasable fastenings, to clamp the flanges together between a suitable gasket to afford a vacuum tight joint.

The subatmospheric pressure level is established and maintained in the chamber by operation of a vacuum pumping mechanism.

In order to maintain vacua of the orders of magnitude mentioned, the tank 13 is provided with a vacuum connection or manifold 29 in the outer side wall 23 communicating with the chamber 31 and extending to any appropriate type of pump, such as a diffusion pump 32.

Also included in the vacuum system is a mechanical displacement pump 33, acting as a backing pump for the diffusion pump 32 and connected thereto by a conduit 34. The effect of the pumps and appurtenances is to afford a steady, regulated, subatmospheric pressure within the tank 13.

In order to open the top half of the vacuum tank 22 for inspection and maintenance of the inner cavity 14 and the drift tubes 16, a hinge 35 is provided. Two hydraulic cylinders 19 actuate the cover 22 and comprise a liquid tight tube 36, two cover or end plates 37 and 38, held together by tie bolts 39, a connecting rod 41, a piston in tube 36 attached to connecting rod 41, and a packing gland 42, to prevent leakage of the liquid.

In operation the fastenings 27 and 28 are removed and a liquid is forced into opening 43 thereby forcing the piston down the cylinder 19 which pulls the vacuum tank cover 22 open on pivot hinge 35. When the cover is all the way open holes 44 and 45 are brought into alignment and a slide pin is inserted so the liquid pressure may be removed from opening 43 and the tank cover 22 will remain open. The pivot pin 46 allows the cylinder 19 to swivel as the tank cover 22 is being opened.

The vacuum tank 13 is supported on rollers 47 and 48 and is held from any longitudinal travel by the vacuum manifold 29 and 31 which is fastened to the floor. The vacuum tank 13 rides on these rollers and allows for any thermal expansion which might take place in the tank.

End walls 24 of the vacuum tank 13 are provided with flanged extensions 49 and 51 affording communication with external apparatus for entrance and exit of the ion beam.

There is disposed within the tank 13 a liner or inner cavity (Figs. 6, 7, 9, 10 and 14) generally designated 14, symmetrically mounted therein.

The inside of the liner 14 has a twelve sided configuration and is composed of twelve narrow strips of copper 52 riveted, or otherwise fastened together on the edges, the entire structure is attached to a plurality of dural channel shaped rings 53 to afford rigidity to the linear. Copper end plates 59 are riveted and soldered to the side strips 52 which forms a closed cavity of substantially cylindrical shape.

Small angle clips 57 are riveted to the channel rings 53 and rest upon brackets 58 which are welded to the vacuum tank 13 as to support and maintain the liner 14 in appropriate axial and radial position.

Like the vacuum tank 13, the upper section of the liner 14 is made removable between the points 54 and 56 to facilitate any work that might have to be done on the interior of the liner.

In order to remove heat that is evolved from the liner 14 during operation there is provided a cooling fluid circulating system comprising a number of longitudinal copper cooling tubes 61 connected together to water manifolds 62 and 63 which lead outside the vacuum tank 13 to any suitable source of cooling fluid, such as water, under the control of a regulating valve of any standard kind to regulate the water or comparable cooling liquid into the cooling tubes 61.

Suitable manifolds are provided on the other end of the liner to connect the cooling tubes 61 together to form a passageway for carrying away from the structure the discharged fluid.

Figure 13:
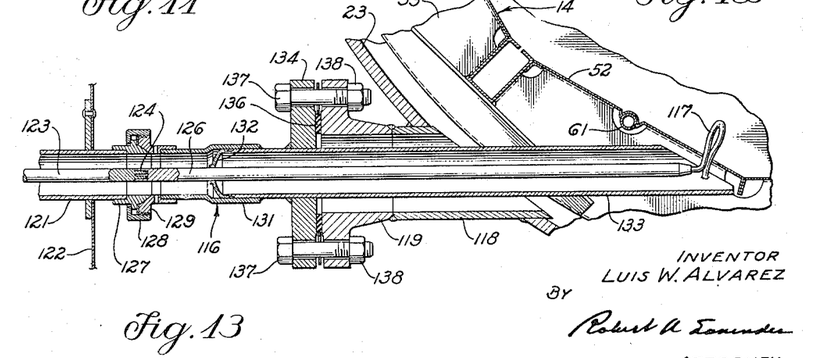
Fig. 13 is a sectional view showing the details of an energizing loop, a portion of the transmission line being broken away to reduce the size of the illustration.
Figure 14:
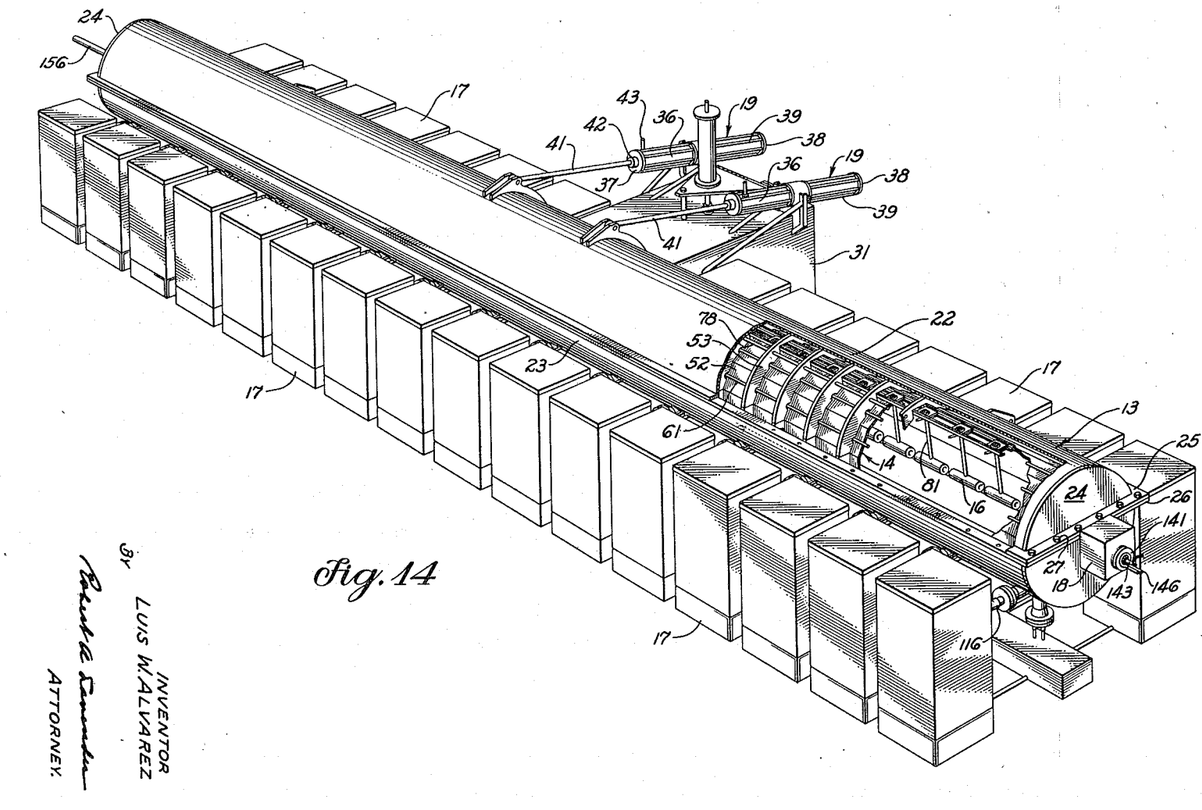
Fig. 14 is a isometric perspective showing the entire accelerator and oscillators with part of the vacuum tank broken away to disclose the inner cavity and drift tubes.

Liner strips 52 are formed around the cooling tubes 61 as shown in Fig. 13 and united closely together, preferably by means such as solder, copiously applied to increase the thermal path of conduction between the parts. Heat is then more readily transferred from the metal parts of the liner through the walls of the tube to the fluid circulating therein.

In order to facilitate the removal of air and gases from the interior of the liner 14 a number of apertures or slots 64 are provided adjacent to the vacuum manifold 29. Inasmuch as the electrical current flow is longitudinal in the liner 14, it is desirable to make the slots as narrow as possible in the radial direction but it is permissible to allow them to be made long in the longitudinal direction without disturbing the current flow therein.

Figures 11, 12:
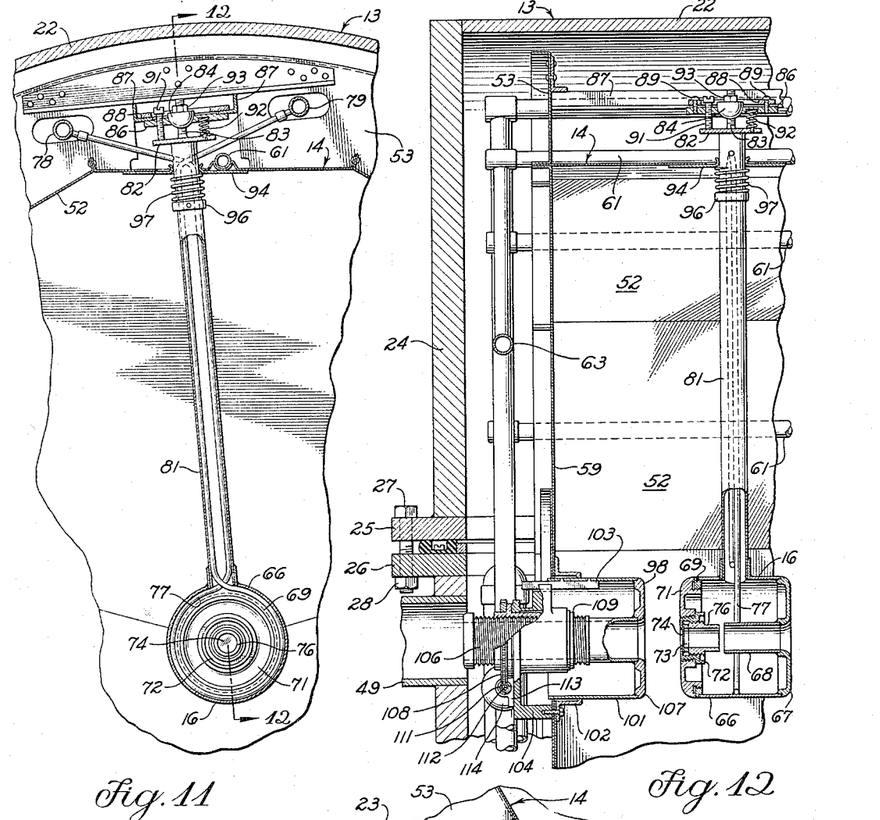
Fig. 11 is a fragmentary view of a drift tube, being generally in cross section, the plane of which is indicated by the line 11—11 of Fig. 7.
Fig. 12 is a fragmentary view that is comparable to a section on a plane indicated by the line 12—12 of Fig. 11, disclosing the two end drift tubes.

Pursuant to the invention, there are provided drift tubes 16 shown in Figs. 6, 7, 9, 14 and in enlarged detail in Figs. 11 and 12. The construction of each of the drift tubes 16 is substantially identical with the exception of the diameter which decreases and the length which increases as they are disposed down the length of the accelerator.

The drift tube is composed of a tube 66 in which is soldered a cap 67 which maintains tube 68 in coaxial alignment with the outside tube 66. On the other end of the outside tube 66 is soldered a boss 69 with an internal thread. Cover 71 is threadably attached to the boss 69 and forms a support for the removable base portion 72. Removable base portion 72 forms a base for the foil holder 73 and the foil 74 which are held in place by a threaded retaining tube 76. The foil 74, that is used for focusing the ion beam, is made from berylium about 25 millionths of an inch thick and is cemented to the foil holder 73 in order to facilitate the handling of the foil. When it is desirable to change or substitute a foil it is only necessary to remove the drift tube cover 71 and, upon manipulation of the base 72 the entire focusing foil assembly is readily removed and another entire assembly substituted in a minimum of time.

Since the drift tubes are disposed in strong radio-frequency fields and are also being bombarded by the ion beam, they are conveniently fabricated of copper or comparable material which is effective as a thermal and electrical conductor. Inasmuch as the drift tubes operate at an elevated temperature, there is provided means for cooling the drift tubes with a supply of cooling fluid, such as water, circulating through cooling tube 77 soldered directly to the inside of tube 66. Cooling tube 77 connects to main longitudinal fluid manifolds 78 and 79 which run to the outside of main vacuum tank 13 to an external source of cooling liquid, not shown.

Tube 66 is soldered, or otherwise fastened, to a tubular post 81, which is fastened to flange plate 82 with an associated threaded stud 83 and a hemispherical ball 84. Mounting plate 86 forms a socket for the ball 84 and is clamped between liner angles 87 by clamping plate 88 and held in position by screws 89.

To afford a universally orientable mounting, the plate 86 serves as a support for two screw studs 91 and two pressure springs 92, and the projecting portion of each of these screw studs presses on flange plate 82. In its median position, the flange plate 82 is substantially parallel to mounting plate 86, but it is adapted to move out of parallelism by manipulating screw studs 91, thus effecting an axial or horizontal adjustment of the drift tube 16. By advancing or retracting the nut 93 and readjusting screw studs 91, a vertical motion of drift tube 16 is accomplished to any desired selected value. To cover the enlarged aperture in liner strip 52 a cover disk 94 is provided and is held in close abutment to liner strip 52 by the collar 96 and the spring 97, thus permitting movement of drift tube post 81, while effectively closing the enlarged aperture.

In order to tune the liner or cavity 14 to the required frequency or wave length, there is provided means for moving the two similar end drift tubes 98 and 99, preferably in accordance with a very careful electromechanical control.

In order to move the end drift tube, the tube 101 is freely movable within the flange shell 102 and is provided with a restraining arm 103 engaging a slot in the mounting bracket 104, to prevent any rotation but permit axial movement. Threaded sleeve 106 is soldered, or otherwise fastened, to nose plate 107 which is secured to the outer tube 101. Threaded sleeve 106 is engaged by threads on a hubbed worm wheel 108, which is confined against translation in one axial direction by collar 109 and in the other by abutment between the hub of the wheel and the mounting bracket 104.

The worm wheel 108 may be rotated by virtue of its engagement with a worm 111 made fast on a shaft 112. The shaft 112 is journaled in bearings 113 which are fastened on mounting bracket 104. The worm 111, being fast on shaft 112, rotates therewith when the shaft is rotated by the electric motor 114. Upon energizing the motor 114 in the desired direction the shaft 112 and worm 111 rotate and turn the worm wheel 108, thus advancing or retracting the end drift tube 98 in the desired axial direction.

Although it may be preferable to excite the accelerator with a single high power oscillator, there is illustrated and described an accelerator which is excited with a multiplicity of lower powered oscillators each coupled at proper intervals along the length of the accelerator wave guide. Furthermore, as an expedient thirty lower power oscillators carrying the designation "Signal Corps BC-677 Radar Transmitter" are utilized. Each radar transmitter 17 is a complete push-pull-parallel type oscillator utilizing four forced air cooled triode vacuum tubes with a peak power output of about 100 kilowatts, at 205 megacycles per second. All thirty oscillators are pulsed simultaneously and in synchronism from a common power source, thus being in effect one large high powered oscillator. The frequency of oscillation of the oscillators is dependent on the resonant frequency of the accelerator cavity, therefore all oscillators will be operating on an identical frequency.

Power from the oscillators 17 is fed to the accelerator through a coaxial transmission line 116 to a coupling loop 117 within the liner or cavity 14 shown in enlarged detail in Fig. 13. In order to provide a vacuum tight entrance for the transmission line 116, an extension tube 118 is welded to the side of the tank wall 23, and tube 118 is provided with a flanged extension 119, welded thereto. Tube 121 forms the outer conductor of the transmission line and is fastened to the oscillator side 122, to form a rigid extension. Inner conductor rod 123 is attached to the internal oscillator circuit, and is provided with a slotted friction pin 124, which engages a hole in conductor 126, thus forming a removable electrical connection therewith. Outer conductor 121 is provided with a flange plate 127 and an internally threaded flange nut 128, threadably attached to the threaded coupling 129, thus forming a rigid junction mechanically and electrically between tube 121 and extension tube 131. Inner conductor 126 is bonded to a glass insulator 132 forming a vacuum tight joint. Coupling loop 117 is soldered to conductor 126 and is contoured in the shape of a semicircle and is returned and soldered to outer tube 133, forming a complete electrical circuit. Glass insulator 132 is bonded to tube 133 to form a complete vacuum tight seal, after which extension tube 131 is soldered to tube 133 thereby forming a rigid connection.

Tube 133 is hard soldered to a cover plate 134 which is bolted to flange 119 with a suitable rubber gasket 136 therebetween to form a vacuum tight joint when bolts 137 and nuts 138 are tightened.

An aperture of elliptical contour is provided in liner strip 52 for the admittance of coupling loop 117.

Figure 8:
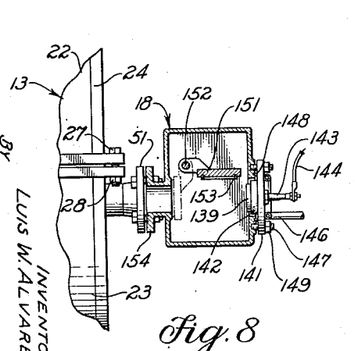
Fig. 8 is an enlarged section view of the target chamber shown in Fig. 7, the plane of section being indicated by the line 7—7 of Fig. 6.

Axially mounted on flange 51 of tank 13 is a vacuum tight target chamber generally designated 18, shown in vertical cross section in Fig. 8.

The stream of ions after being accelerated by the accelerator are received by the target chamber 18 and impinge on a target 139 which is insulated from the target face plate 141 by insulator disk 142. A vacuum tight electrical feedthrough insulator 143 connects to the target 139 and to an external electrical conductor 144 which emerges to a remote instrument or meter, not shown, so that the ion beam current can be indicated or registered.

Inasmuch as the target 139 and target face plate 141 are under direct ion bombardment, there is provided means for cooling the face plate 141 by cooling tube 146 which is thermally united to the face plate by copious amounts of solder. Cooling fluid or liquid, such as water, is circulated through the cooling tube 146 at a sufficient rate to maintain the temperature of the parts below a selected maximum value.

Face plate 141 and its associated parts is clamped to target chamber 18 by a multiplicity of studs 147 and tightened against gasket 148 by nuts 149 thereby affording a vacuum tight junction, yet the entire face plate 141 is readily removable for changing or substitution of targets.

When the target assembly is removed it is highly desirable that the main tank 13 is not let down to atmospheric pressure, therefore a closeable gate 151 is provided. Gate 151 is mounted on a shaft 152 which extends outside of the chamber 18 through a suitable packing gland to a suitable actuating mechanism, not shown, which when energized will close the gate 151 against gasket 153 and the chamber 18 affording a vacuum tight seal.

Vacuum chamber 18 is provided with a flanged extension 154 which is bolted, or otherwise fastened, with releasable fastenings, to flange 51 to make a rigid vacuum tight junction and support for the target chamber and its associated parts.

Flanged tube 156 provides a vacuum tight connection from flange 49 on tank 13 to a suitable flange on the source of ions, such as the electrostatic generator 21.

In operation of the accelerator, the oscillators are energized to excite the wave guide 14. Ions from a source thus enter the wave guide and start along the axis thereof. The ions are grouped into synchronized pulses and are made to enter the accelerator system at the proper time to achieve phase stability.

After the ions enter the wave guide, they are accelerated along the axis of the wave guide through the drift tubes until they reach the target 139, receiving an additional acceleration as they pass through each drift tube in the wave guide.

The design of the drift tubes depends upon the velocity with which the ions enter the wave guide. An electrostatic generator can be used for example as a source of potential to produce initial accelerations of four to four and one half million electron volts.

While the invention has been described with particular reference to the acceleration of ions, it will be appreciated that it is also applicable to the acceleration of electrons or other electrically charged particles.

It will therefore be understood that this invention is not to be limited to the details of the structure and methods of operation hereinabove described but that many modifications may be made in the apparatus and method within the scope of the following claims.

What is claimed is:

1. An apparatus for accelerating high velocity ions comprising a wave guide, a radio-frequency generator for energizing said wave guide to produce a longitudinal electric field therein, a series of graded length drift tubes spaced apart to form gaps disposed within said wave guide along the longitudinal axis thereof, said drift tubes also having graded diameters thereby establishing said longitudinal electric field in a uniform manner throughout the entire length of said wave guide, means for axially introducing high velocity ions into said wave guide whereby said ions will be further accelerated uniformly through the entire length of said wave guide.

2. A linear ion accelerator comprising a hollow elongated substantially closed wave guide, a series of coaxial tubes disposed within said wave guide along the axis thereof, a radio-frequency generator for exciting said wave guide to produce an axial electric field therein, means for injecting ions into said wave guide at the increasing voltage portion of the excitation cycle thereby producing a phase-stabilized ion beam accelerated through said coaxial tubes, and a thin metallic foil covering the entrance end of each of said coaxial tubes thereby establishing the electric field in a desired fashion to control said phase-stabilized ion beam divergence.

3. An apparatus for accelerating high velocity ions comprising a wave guide, a means for energizing said wave guide, a series of drift tubes spaced apart to form gaps disposed within said wave guide along the longitudinal axis thereof, and means for altering the length of the first and the last drift tube of said series thereby tuning said wave guide to a predetermined frequency whereby high velocity ions are further accelerated.

4. An apparatus for accelerating high velocity ions comprising a hollow elongated substantially closed wave guide, a series of coaxial tubes, said coaxial tubes being graded smaller in diameter and longer in length as they are disposed within said wave guide along the longitudinal axis thereof and spaced apart to form gaps, a plurality of simultaneously pulsed radio-frequency generators, a plurality of coaxial transmission lines associated with said radio-frequency generators and each having an outer conductor connected to the wall of said wave guide and an inner conductor entering the interior of said wave guide in the form of a coupling loop whereby said radio-frequency generators energize said wave guide to produce a uniform axial electric field therein, means for axially introducing ions into said coaxial tubes at the proper phase of oscillation of said radio-frequency generators thereby producing a phase-stabilized ion beam subjected to repeated acceleration as it crosses said gaps, means for shielding said ions from the decelerating effect of the electric field in the reverse half cycle of said radio-frequency generators, a thin metallic foil covering the opening at the entrance end of each of said coaxial tubes to form the electric field in said gaps in a predetermined fashion to control the divergence of said ion beam.

5. An apparatus for accelerating high velocity ions comprising a hollow elongated substantially closed wave guide, a series of coaxial tubes, said coaxial tubes being graded smaller in diameter and longer in length as they are disposed within said wave guide along the longitudinal axis thereof and spaced apart to form gaps, a plurality of simultaneously pulsed radio-frequency generators, a plurality of coaxial transmission lines associated with said radio-frequency generators and each having an outer conductor connected to the wall of said wave guide and an inner conductor entering the interior of said wave guide in the form of a coupling loop whereby said radio-frequency generators energize said wave guide to produce a uniform axial electric field therein, a source of high velocity ions including an electrostatic generator, means for axially introducing said ions into said coaxial tubes at the proper phase of oscillation of said radio-frequency generators thereby producing a phase-stabilized ion beam subjected to repeated acceleration as it crosses said gaps, means for shielding said ions from the decelerating effect of the electric field in the reverse half cycle of said radio-frequency generators, a thin metallic foil covering the opening at the entrance end of each of said coaxial tubes to form the electric field in said gaps in a predetermined fashion to control the divergence of said ion beam.

6. An apparatus for accelerating high velocity ions comprising a wave guide, a radio-frequency generator for energizing said wave guide to produce a longitudinal electric field therein, a series of drift tubes spaced apart to form gaps disposed within said wave guide along the longitudinal axis thereof, said drift tubes having graded diameters thereby establishing said longitudinal electric field in a uniform manner throughout the entire length of said wave guide, and means for axially introducing high velocity ions into said wave guide whereby said ions will be further accelerated uniformly through the entire length of said wave guide.

7. An apparatus for accelerating high velocity ions comprising a wave guide, a radio-frequency generator for energizing said wave guide to produce a longitudinal electric field therein, a series of drift tubes spaced apart to form gaps disposed within said wave guide along the longitudinal axis thereof, a planar ion transparent surface covering the entrance end of each of said drift tubes, and means for introducing high velocity ions axially into said wave guide during the increasing voltage portion of the energization cycle whereby said ions will be further accelerated and focused for the entire length of said wave guide.

8. An apparatus for accelerating high velocity ions comprising a wave guide, a radio-frequency generator for energizing said wave guide to produce a longitudinal electric field therein, a series of drift tubes spaced apart to form gaps disposed within said wave guide along the longitudinal axis thereof, said drift tubes having graded diameters thereby establishing said longitudinal electric field in a uniform manner throughout the entire length of said wave guide, a planar ion transparent surface positioned parallel to and in close proximity to the entrance end of said drift tubes so as to impart a focusing action to said longitudinal electric field across said drift tube gaps, and means for introducing high velocity ions axially into said wave guide whereby said ions will be further accelerated and focused uniformly for the entire length of said wave guide.

9. An apparatus in accordance with claim 7 wherein said drift tubes have respectively increasing diameters from said ion introducing means for establishing said longitudinal electric field in a uniform manner throughout the entire length of said wave guide.

10. An apparatus in accordance with claim 7 wherein said drift tubes have respectively decreasing length from said ion introducing means, the first and last of said drift tubes being adjustable in length for tuning said wave guide to a predetermined frequency.

11. An apparatus for accelerating high velocity ions comprising a hollow elongated substantially closed wave guide, a series of coaxial tubes disposed in spaced apart relation within said wave guide along the longitudinal axis thereof, said coaxial tubes being graded larger in diameter and shorter in length from one end to the other of said wave guide, a plurality of synchronized radio-frequency generators, a plurality of coaxial transmission lines connected at one end to said generators and having a coupling loop at the other end extended within said wave guide to produce a uniform axial electric field therein, means for axially introducing ions into the coaxial tube having the smallest diameter and longest length during the increasing voltage portion of said axial electric field, a thin metallic foil disposed across the entrance opening of each of said coaxial tubes, and means for altering the length of the first and last coaxial tube.

LUIS W. ALVAREZ.

REFERENCES CITED

The following references are of record in the file of this patent:

UNITED STATES PATENTS

| Number | Name | Date |
|---|---|---|
| 2,058,914 | Rudenberg | Oct. 27, 1936 |
| 2,158,314 | Korshenewsky | May 16, 1939 |
| 2,163,740 | Wales | June 27, 1939 |
| 2,225,917 | Mahl | Dec. 24, 1940 |
| 2,264,541 | Mahl | Dec. 2, 1941 |
| 2,284,751 | Linder | June 2, 1942 |
| 2,289,756 | Clavier et al. | July 14, 1942 |
| 2,398,162 | Sloan | Apr. 9, 1946 |
| 2,431,113 | Glyptis et al. | Nov. 18, 1947 |